(12) United States Patent
Shi

(10) Patent No.: US 6,980,729 B2
(45) Date of Patent: Dec. 27, 2005

(54) FIBER OPTIC LIGHTED INSTRUMENT PANEL

(75) Inventor: Zhong-You Joe Shi, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 188 days.

(21) Appl. No.: 10/681,528

(22) Filed: Oct. 8, 2003

(65) Prior Publication Data

US 2005/0078925 A1  Apr. 14, 2005

(51) Int. Cl.$^7$ ............................. G02B 6/00; F21V 8/00
(52) U.S. Cl. ...................... 385/901; 385/123; 362/23
(58) Field of Search ............................. 385/123, 901; 382/23, 26, 28–31, 554–556, 582, 583

(56) References Cited

U.S. PATENT DOCUMENTS

| | | | |
|---|---|---|---|
| 3,971,891 A | | 7/1976 | Wolcott |
| 4,422,719 A | | 12/1983 | Orcutt |
| 4,471,412 A | | 9/1984 | Mori |
| 4,747,658 A | | 5/1988 | Borsuk et al. |
| 4,759,600 A | | 7/1988 | Caron et al. |
| 4,977,487 A | * | 12/1990 | Okano .......................... 362/555 |
| 5,027,259 A | | 6/1991 | Chujko |
| 5,050,956 A | | 9/1991 | Carpenter et al. |
| 5,187,765 A | * | 2/1993 | Muehlemann et al. ...... 385/115 |
| 5,222,795 A | | 6/1993 | Hed |
| 5,321,784 A | | 6/1994 | Cubukciyan et al. |
| 5,606,637 A | | 2/1997 | Dolby |
| 5,653,519 A | * | 8/1997 | Dobbs .......................... 362/551 |
| 5,816,626 A | | 10/1998 | Anderson et al. |
| 5,901,267 A | | 5/1999 | Lee |
| 6,206,533 B1 | * | 3/2001 | Shi .............................. 362/23 |
| 6,431,717 B1 | | 8/2002 | Anderson et al. |

FOREIGN PATENT DOCUMENTS

| | | |
|---|---|---|
| JP | 63-064007 | 3/1988 |
| JP | 1-134406 | 5/1989 |
| JP | 2-85808 | 3/1990 |

* cited by examiner

*Primary Examiner*—Frank G. Font
*Assistant Examiner*—Christopher M. Kalivoda
(74) *Attorney, Agent, or Firm*—Brinks Hofer Gilson & Lione

(57) ABSTRACT

An optical fiber lighted instrument panel includes an instrument panel having at least one portion to be illuminated disposed in a vehicle. The optical fiber lighted instrument panel contains at least one optical fiber with at least one predetermined aperture formed in the cable by selective application to specific areas to the core of the optical fiber cable, thus allowing light to emit from the optical fiber cable and illuminate the desired areas of the instrument panel. The optical fiber lighted instrument panel further includes the addition of high-refractive index paint to achieve uniform and assorted colors of light emitting from the optical fiber. The invention further includes the addition of a wheel with various colored filters attached in-line between the light source and the inlet of the optical fiber to allow the user to select what color they desire to be illuminated from the cable.

9 Claims, 3 Drawing Sheets

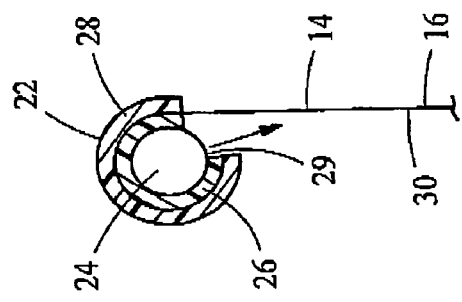
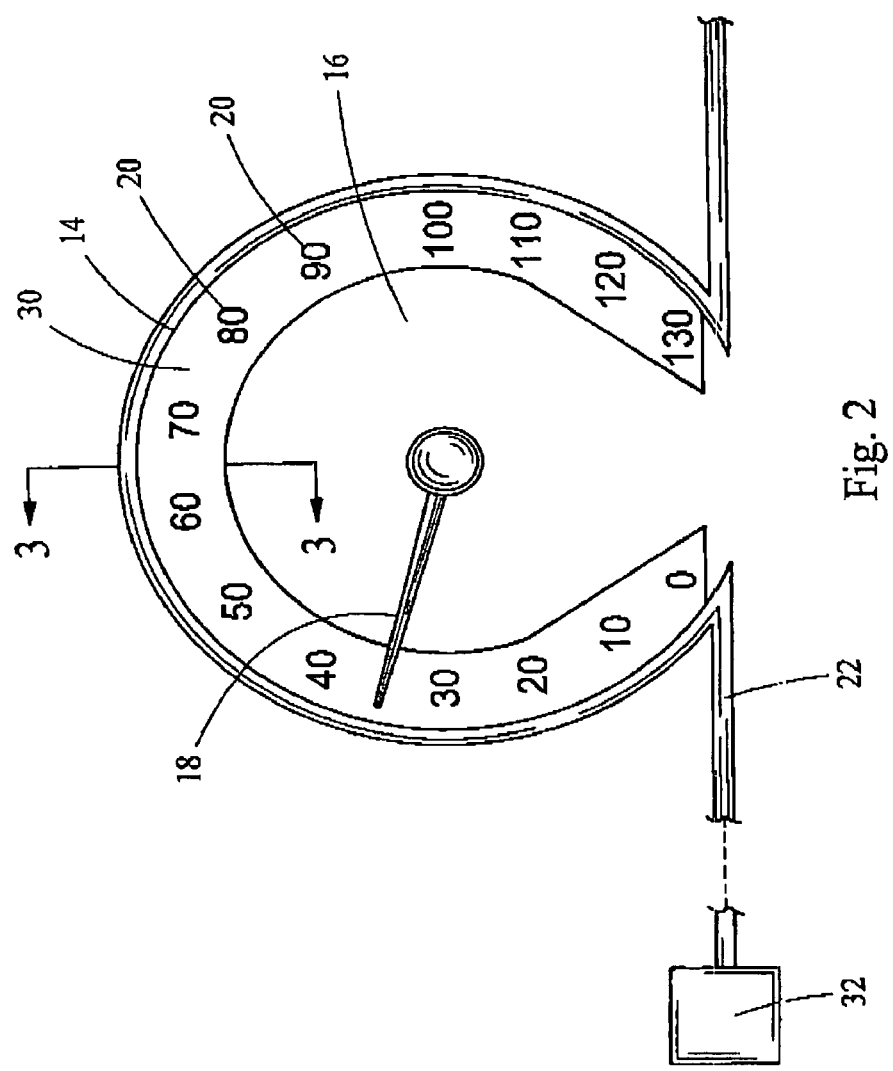

FIBER OPTIC LIGHTED INSTRUMENT PANEL

FIELD OF THE INVENTION

The present invention relates generally to instrument panels for vehicles and, more specifically to an optical fiber lighted instrument panel for a vehicle.

DESCRIPTION OF THE RELATED ART

It is known to provide an instrument panel for a vehicle such as a motor vehicle. The instrument panel extends laterally across an occupant compartment of the motor vehicle in front of seated occupants therein. The instrument panel typically includes a number of gages such as a speedometer. These gages may be illuminated by backlighting with incandescent lamps disposed behind the gages. The illuminating lamps and other hardware in these configurations may be difficult to service and may use a significant amount of electricity.

It is also known that optical fiber light cables are used for high-speed communication and data transmission. These optical fiber light cables usually consist of a core, cladding, and a protective jacket. The core has a higher refractive index than that of the cladding so that the light is confined within the core if the incident angle is less than the critical angle.

U.S. Pat. No. 6,206,533 ("the '533 patent") discloses the use of an optical fiber light cable to provide illumination to a vehicle instrument panel. The '533 patent teaches the scratching or removal of the optical fiber cable cladding layer in previously cladded areas as desired to emit light to illuminate the instrument panel. The cable is arranged in such a manner as to meet the requirements for the panel. The process disclosed in the '533 patent requires significant manipulation of the optical fiber cable in order to scratch or remove the cable cladding. This manual manipulation may lead to potential damage to the cable and larger than necessary manufacturing costs stemming from cables damaged by manipulation.

There is a need in the art to provide an improved optical fiber lighted instrument panel for a vehicle. Also, there is a need in the art to provide an improved optical fiber light cable to illuminate an instrument panel for a vehicle. Further, there is a need in the art to eliminate the inefficiencies associated with the backlighting of an instrument panel.

BRIEF SUMMARY OF THE INVENTION

The present invention relates to an improved method of fabricating the optical fiber cable and methods to achieve uniform light characteristics throughout portions of the optical fiber cable.

In one aspect of the present invention, the optical fiber cable used to provide the light source for the vehicle instrument panel is manufactured to include an aperture defined in the cladding layer of the cable to expose the core of the optical fiber cable, which will allow light to emit from the cable and provide light to the vehicle instrument panel. While the prior art requires the scratching or removal of the cladding layer to form the aperture, the aperture in the current invention is formed by employing the manufacturing equipment to selectively apply the cladding layer in areas to form a predetermined aperture during the original manufacture of the cable.

In another aspect of the present invention, high-refractive index paint may be applied to predetermined areas of the cladding aperture to increase the amount of light that will emit from the optical fiber cable. The high-refractive index paint can be mixed with dyes that will fluoresce or phosphoresce when exposed to light. The application of paint and/or dye allows the design of an instrument panel that emits a uniform light intensity from the optical fiber cable source. Also, the different areas of the optical fiber cable can be painted with different paint colors or dyes to cause different portions of the instrument panel to be illuminated by light of assorted colors from the same optical fiber cable.

In another aspect of the present invention a wheel consisting of different colored filters may be placed between the light source and the inlet of the optical fiber cable. Each of the filters will be chosen to allow only certain colors of light to pass, allowing the same light source and cable to produce different colors of light. The filter color wheel can be controlled by the vehicle occupant using any mechanical or electrical method as is known in the art.

BRIEF DESCRIPTION OF SEVERAL VIEWS OF THE DRAWINGS

FIG. 2 is an enlarged elevational view of a portion of the optical fiber lighted instrument panel if FIG. 1;

FIG. 3 is a sectional view taken along line 3—3 of FIG. 2;

DETAILED DESCRIPTION OF THE INVENTION

Figure 1:
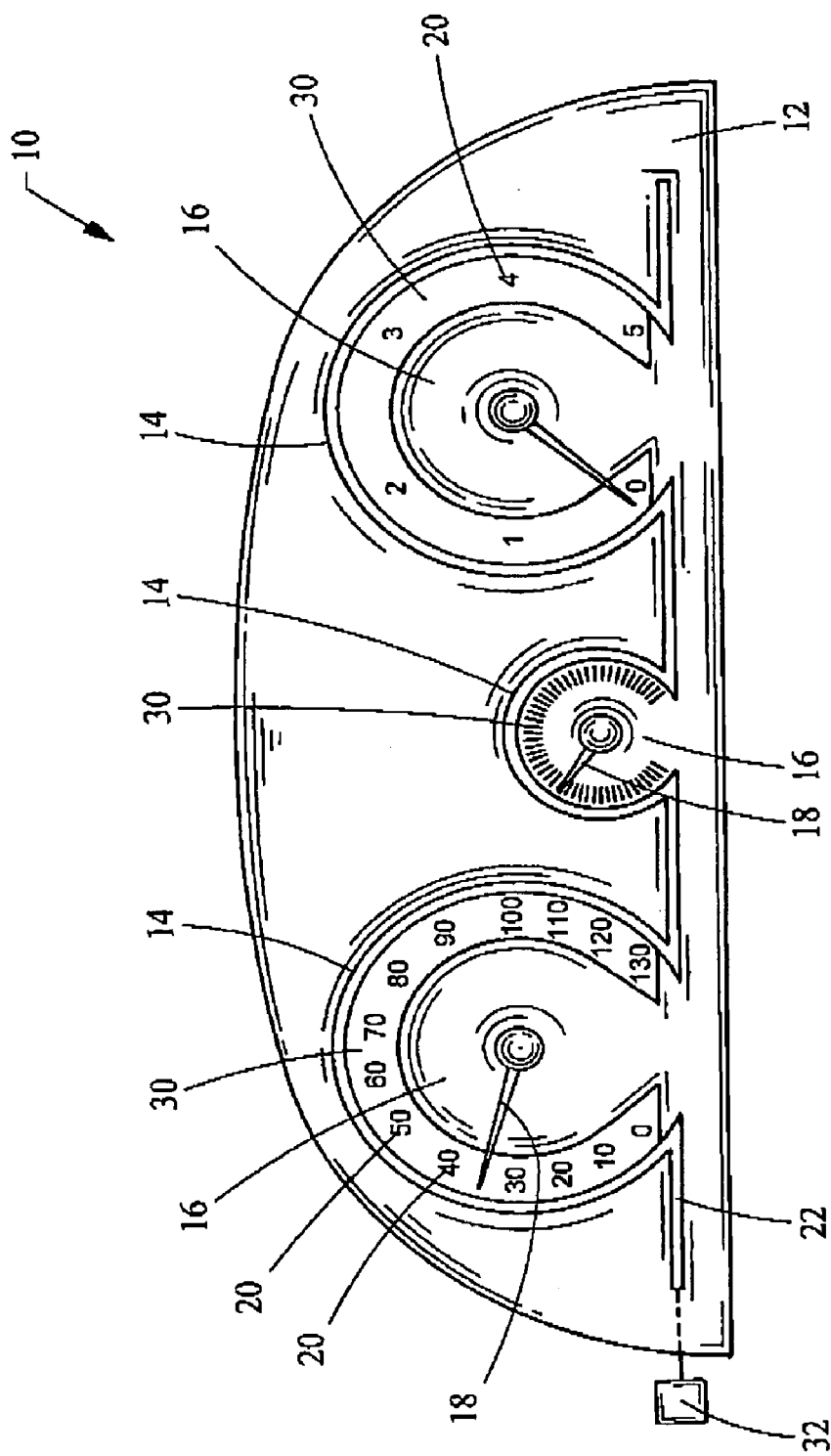
FIG. 1 is an elevational view of a optical fiber lighted instrument panel, according to the present invention.

Referring to the drawings and in particular to FIGS. 1 and 2, one embodiment of an optical fiber lighted instrument panel 10, according to the present invention, is shown for a vehicle (not shown) such as a motor vehicle. The optical fiber lighted instrument panel 10 includes an instrument panel 12, which extends laterally across an occupant compartment (not shown) of the vehicle. The instrument panel 12 includes at least one, or a plurality of meters or gages 14 such as a speedometer, tachometer and the like as is known in the art. The gages 14 have a gage member 16 and a needle 18 pivotally connected to the gage member 16. The gage member 16 is generally circular in shape and has a plurality of indicia 20 such as numbers spaced circumferentially about a periphery thereof. The needle 18 moves or pivots in response to a signal from a controller (not shown). It should be appreciated that the gages 14 are conventional and known in the art and other types of analog and/or non-analog indicators may be implemented.

Referring to FIGS. 1 through 3, the optical fiber lighted instrument panel 10 also includes an optical fiber light cable 22 disposed about a portion of a periphery of the gages 14. The optical fiber light cable 22 has a core 24, cladding 26 disposed about the core 24 and a protective jacket 28 disposed about the cladding 26. The optical fiber light cable 22 extends longitudinally toward a base of the gage member 16 and circumferentially around the periphery of the gage member 16 and longitudinally away from the base of the gage member 16.

A portion of the circumference of the optical fiber cable 22 is manufactured by applying a cladding layer 26 that will block light from being admitted from said cable and covering only selected portions of the core 24 thereby defining an aperture 29 along a portion of the length and circumference of the cable 22. For example, an aperture 29 may be formed with predefined geometry by applying cladding 26 on one portion of the circumference and length of the cable 22 as it extends around the components of the instrument panel 12 so that light transferred inside the core 24 is emitted through the aperture 29 to illuminate a desired area 30 of the instrument panel 12. The optical fiber cable can be manufactured with more than one cladding aperture 29 to allow light emitting from the optical fiber cable core 24 to illuminate multiple independent features of the vehicle instrument panel 12. The cladding aperture is formed by utilizing the optical fiber cable manufacturing equipment to apply the cladding layer 26 in such an orientation as to form the predefined aperture 29. For example, a masking layer can be applied to areas of the optical cable core that are desired to form the cladding aperture that will resist cladding application. Or, in the alternative, a co-extrusion molding molding process may be used as known in the art.

It is important to understand that the particular geometry of the predefined aperture 29 created in the cladding layer 26 of the optical fiber cable 22 is a function of the size and location of the gages or other details in the instrument panel 12, along with the desired intensity and direction of the light to be admitted from or to the instrument panel. The optical fiber cable 22 is with predefined aperture 29 can be arranged such that the aperture 29 is facing the area of the instrument panel 12 to be illuminated 30 such that the light that emits from the optical fiber cable core 24 is directed to the desired area 30.

Figures 4, 5:
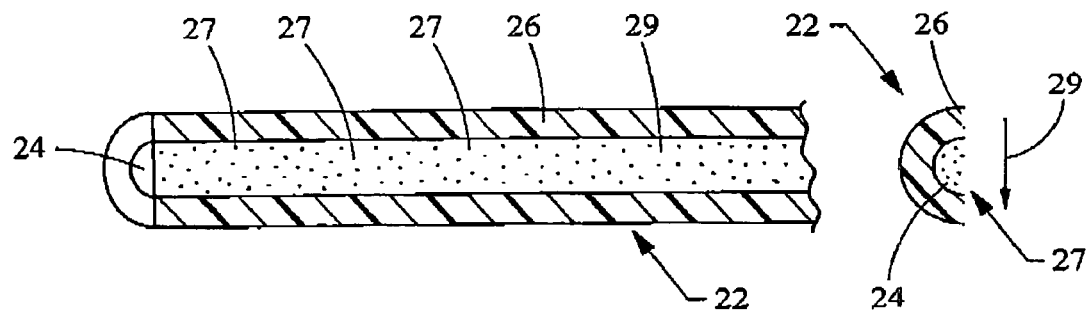
FIG. 4 is a longitudinal view of the aperture created in the cladding layer of the optical fiber cable, with high-refractive-index paint applied to predetermined areas.
FIG. 5 is a cross-sectional view of the optical fiber cable with the aperture in the cladding layer.

Referring to FIGS. 4 and 5, in addition to manufacturing the optical fiber cable 22 with the cladding aperture 29, high-refractive index paint 27 may be applied to the core 24 of the optical fiber cable 22. The paint is applied to various predetermined cladding apertures 29 onto the optical fiber core 24 to increase the index of refraction at these locations and cause more light to be emitted from the optical fiber cable core 24. The paint is applied in predetermined sizes, locations, and thicknesses in order to enhance the emitted light or create uniform light intensity characteristics to light the instrument panel 12 or gage member 16. The high-refractive index paint 27 can be applied using any method of applying paint or ink to a surface as is known in the art, for example, by stencil printing. It is important to note that the particular color, geometry, and thickness of paint applied to the core 24 of the optical fiber cable 22 will vary depending on design details, such as varieties in with respect to the size and geometry of the instrument panel 12 and the amount of light desired to illuminate the desired area 30.

In addition to applying high-refractive index paint 27 to the optical fiber cable core 24, in a different embodiment of the invention the high-refractive index paint is mixed with a dye that will fluoresce or phosphoresce when excited by the optical light from the light source 32. The application of high-refractive index paint with different fluorescable or phosphorescable dyes will allow the emitted light color to vary along the length of the optical fiber cable 22, to allow the same cable 22 to emit different colors or intensities from or to different portions of the instrument panel 12. Types of dyes that will fluoresce or phosphoresce when exposed to optical light are well known in the art. For example, Rhodamines may be used.

The optical fiber light cable 22 may be made of a plastic or glass material. The optical fiber light cable 22 has a generally circular cross-sectional shape and a relatively large diameter. The optical fiber light cable 22 may be a single cable with one or a plurality of predetermined apertures 29 defined therein or a plurality of cables 22 with one or a plurality of predetermined apertures 29 bundled together to form a single cable bundle other shapes and configurations are, of course, possible. The optical fiber light cable 22 is secured to the instrument panel 12 by suitable means such as an adhesive. It should be appreciated that the construction and materials for the optical fiber light cable 22 are conventional and known in the art and may include materials such as acrylics and polycarbonate.

The optical fiber lighted instrument panel 10 includes a light source 32 optically connected to at least one end of the optical fiber light cable 22. The light source 32 can be a light emitting diode (LED), conventional incandescent lamp, a diode laser or the like. The light source 32 emits light, which travels through the core 24 of the optical fiber light cable 22 and is emitted from the core 24 through the defined apertures 29. The emitted light, as indicated by the arrow in FIG. 3, illuminates the desired area 30 of the instrument panel 12, for example gage member 16, so that the seated occupant can visually read the indicia 20. The light source 32 may in turn be connected to a source of power (not shown).

The light source 32 may be selectively filtered to produce light having different colors for illuminating the instrument panel 12. It should be appreciated that more than one light source 32 can be provided and attached to one or both ends of the optical fiber light cable 22. It should also be appreciated that the light source 32 reduces the cost and weight and improves durability of the optical fiber lighted instrument panel 10.

Figure 6:
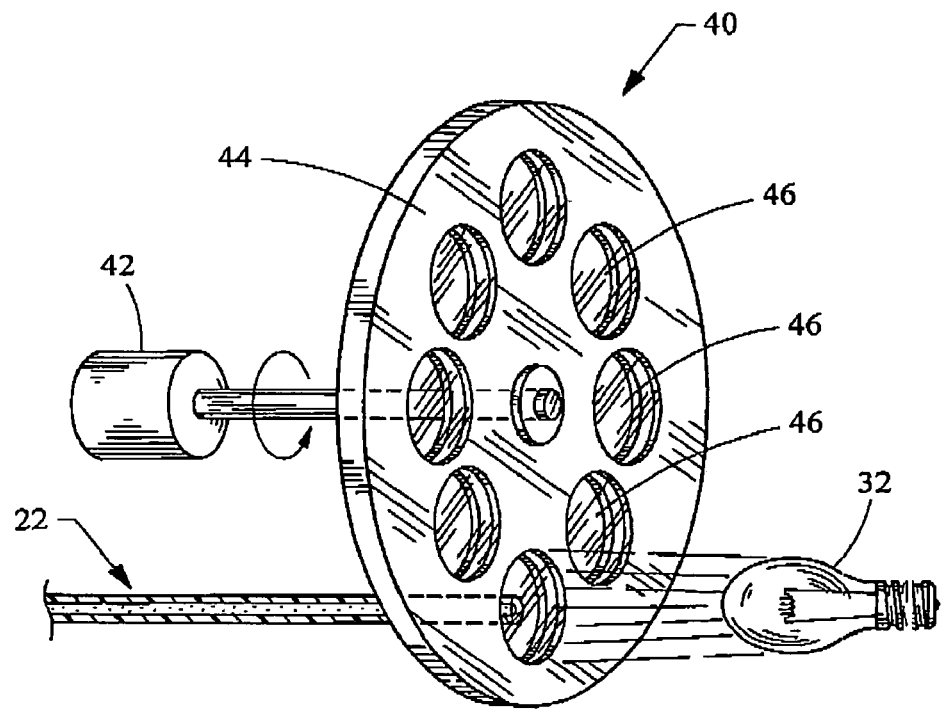
FIG. 6 is an isometric view of one embodiment of the colored filter wheel placed between the light source and the optical fiber cable.

Referring to FIG. 6, one embodiment of the invention includes the use of a filter wheel assembly 40. The assembly includes a wheel 44 of different colored filters 46 placed in-line between the light source 32 and the inlet of the optical fiber cable 22. FIG. 6 illustrates the embodiment having a wheel that can be rotated about the axis of the wheel 44 with an electric motor 42 that is controlled by the vehicle occupant from inside the vehicle. The color wheel assembly 40 is an important embodiment of the invention because it will allow the same light source 32 and cable 22 to provide the instrument panel 12 with number of different colors of light. Although an electric motor 42 is shown, it is important to understand that the color wheel 44 can be controlled by the user by any mechanical or electrical method as is known in the art, such as a mechanical linkage or a fluid controlled mechanism.

The present invention has been described in an illustrative manner. It is to be understood that the terminology, which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of manufacturing an optical fiber illuminated instrument panel comprising the steps of:

providing an instrument panel having a plurality of gages mounted thereto;

providing an optical fiber;

applying a masking layer to said optical fiber in areas desired to have a predefined aperture;

selectively applying at least one layer of cladding around the outer surface of the optical fiber in such a manner to leave at least one predefined aperture on said optical fiber free of said cladding;

affixing said optical fiber to said instrument panel in the vicinity of said instrument panel gages;

providing a light source for illuminating said optical fiber.

2. The method of manufacturing an optical fiber illuminated instrument panel of claim 1, wherein said optical fiber is arranged such that said predefined aperture faces an area to be illuminated.

3. The method of manufacturing an optical fiber illuminated instrument panel of claim 1, wherein said masking layer is adapted to resist the application of cladding.

4. The method of manufacturing an optical fiber illuminated instrument panel of claim 1, further comprising the step of applying high-refractive index paint to said predefined aperture.

5. The method of manufacturing an optical fiber illuminated instrument panel of claim 4, wherein said high-refractive index paint is mixed with dyes that will fluoresce or phosphoresce when excited by optical light from said light source.

6. The method of manufacturing an optical fiber illuminated instrument panel of claim 1, further comprising the step of providing a wheel having a plurality of colored filters interposed between said light source and said fiber to selectively filter the light transmitted to said fiber, wherein a means for selecting said color of light emitted through said aperture is provided.

7. The method of manufacturing an optical fiber illuminated instrument panel of claim 1, further comprising the step of providing a plurality of optical fibers with said at least one aperture to illuminate said instrument panel.

8. The method of manufacturing an optical fiber illuminated instrument panel of claim 1, further comprising the step of defining a plurality of said predefined apertures to said fibers.

9. The method of manufacturing an optical fiber illuminated instrument panel of claim 1, wherein said cladding layer blocks at least a portion of light from being emitted from said optical fiber.

* * * * *